United States Patent

Shimizu et al.

[11] Patent Number: 5,980,778
[45] Date of Patent: *Nov. 9, 1999

[54] LIQUID CRYSTAL COMPOSITION AND LIQUID CRYSTAL DISPLAY ELEMENT COMPRISING THE SAME

[75] Inventors: Takaaki Shimizu; Tatsushi Kaneko; Tsutomu Ogihara, all of Kubiki-mura, Japan

[73] Assignee: Shin-Etsu Chemical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/732,632

[22] Filed: Oct. 16, 1996

[30] Foreign Application Priority Data

Oct. 16, 1995 [JP] Japan .................................. 7-267242

[51] Int. Cl.$^6$ .................. C09K 19/34; C09K 19/30; C07F 7/08

[52] U.S. Cl. .................. 252/299.61; 252/299.63; 252/299.66; 556/406

[58] Field of Search .................. 252/299.01, 299.63, 252/299.61, 299.66; 556/406

[56] References Cited

U.S. PATENT DOCUMENTS

| | | | |
|---|---|---|---|
| 5,496,501 | 3/1996 | Shimizu et al. | 252/299.61 |
| 5,498,737 | 3/1996 | Ogihara et al. | 556/406 |
| 5,523,440 | 6/1996 | Nakashima et al. | 556/406 |
| 5,547,606 | 8/1996 | Kinsho et al. | 252/299.61 |
| 5,567,350 | 10/1996 | Shimizu et al. | 252/299.61 |
| 5,578,244 | 11/1996 | Shimizu et al. | 252/299.61 |
| 5,582,764 | 12/1996 | Nakashima et al. | 252/299.61 |
| 5,641,430 | 6/1997 | Nakashima et al. | 252/299.61 |
| 5,659,059 | 8/1997 | Ogihara et al. | 556/406 |
| 5,679,746 | 10/1997 | Shimizu et al. | 252/299.61 |
| 5,730,902 | 3/1998 | Nakashima et al. | 252/299.61 |
| 5,762,826 | 6/1998 | Shimizu et al. | 252/299.61 |
| 5,868,961 | 2/1999 | Shimizu et al. | 252/299.61 |

FOREIGN PATENT DOCUMENTS

| | | |
|---|---|---|
| 0630903 | 12/1994 | European Pat. Off. . |
| 0648773 | 4/1995 | European Pat. Off. . |
| 0650969 | 5/1995 | European Pat. Off. . |
| 0657460 | 6/1995 | European Pat. Off. . |
| 0659753 | 6/1995 | European Pat. Off. . |
| 0665232 | 8/1995 | European Pat. Off. . |
| 0668284 | 8/1995 | European Pat. Off. . |
| 0668286 | 8/1995 | European Pat. Off. . |
| 0670322 | 9/1995 | European Pat. Off. . |
| 0713878 | 5/1996 | European Pat. Off. . |
| 0718387 | 6/1996 | European Pat. Off. . |
| 6126898 | 3/1980 | Japan . |
| 60-199840 | 10/1985 | Japan . |
| 60-226835 | 11/1985 | Japan . |
| 2503436 | 10/1990 | Japan . |

*Primary Examiner*—Shean C. Wu
*Attorney, Agent, or Firm*—McAulay Nissen Goldberg Kiel & Hand, LLP

[57] ABSTRACT

The invention presents an excellent liquid crystal display composition possessing a negative dielectric anisotropy, comprising one or more compounds selected from the group consisting of formulas I, II, III, IV and V,

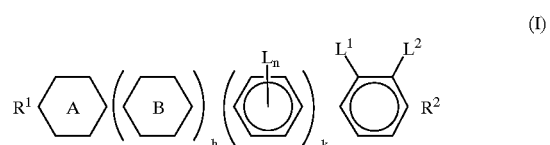

(I)

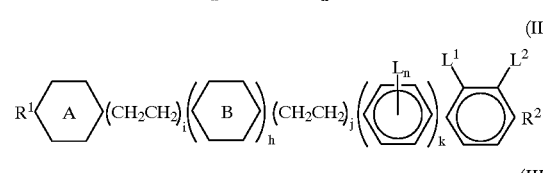

(II)

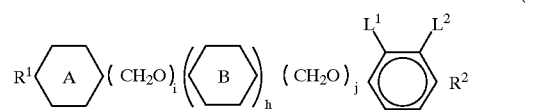

(III)

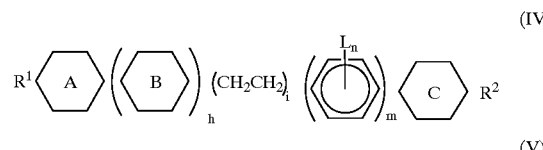

(IV)

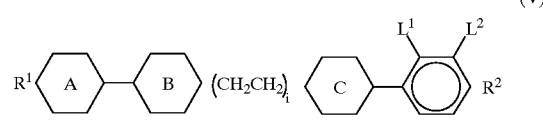

(V)

where $R^1$ is alkyl, alkoxyalkyl, mono- or difluoroalkyl, or alkenyl, with each group having 2 to 7 carbon atoms; h, i, j, and k denote 0 or 1 with proviso that i+j=1; m is 0, 1 or 2; a six-membered ring expressed by A, B, or C respectively represents any one of trans-1-sila-1,4-cyclohexylene, trans-4-sila-1,4-cyclohexylene, or trans-1,4-cyclohexylene group; L represents F; and $L^1$ and $L^2$ represent H or F; n is 0, 1 or 2; and $R^2$ is H, $R^1$ or $OR^1$, in which at least one compound thereof contains trans-1-sila-1,4-cyclohexylene group or trans-4-sila-1,4-cyclohexylene group.

6 Claims, No Drawings

LIQUID CRYSTAL COMPOSITION AND LIQUID CRYSTAL DISPLAY ELEMENT COMPRISING THE SAME

BACKGROUND OF THE INVENTION

1. Field of the Invention

The present invention relates to a liquid crystal composition composed of a liquid crystal compound containing silacyclohexane ring only, or a mixture of it with a conventional liquid crystal compound not containing silicon.

2. Description of the Related Art

A liquid crystal display element makes use of the optical anisotropy and dielectric anisotropy of a liquid crystal substance. Depending on the mode of display, there are TN type (twisted nematic type), STN type (super-twisted nematic type), SBE type (super-birefringent type), DS type (dynamic scattering type), guest-host type, DAP type (deformed array phase type), OMI type (optical mode interference type), and other type of devices. The most general display device possesses a twisted nematic structure depending on Shutt-Hellfritt effect.

Although the properties required of liquid crystal substances used in such liquid crystal displays may be slightly different depending on the display mechanism, wide liquid crystal temperature ranges and stability against moisture, air, light, heat or electric field are common requirements for all display methods. Moreover, the liquid crystal materials are preferred to have low viscosity, short address time, low threshold voltage and high contrast when used in a cell. At the beginning of the line present, there is no known single compound satisfying all of these requirements, and from several to more than ten liquid crystal compounds or latent liquid crystal compounds are mixed for use. Accordingly, it is also important that the constituent components are mutually miscible easily.

In particular, in view of recent developments in multimedia and wide spread use of portable appliances, energy saving and lower driving voltage are demanded in liquid crystal displays. Of the power used in a direct-viewing type liquid crystal display, the backlight consumes about a half, and as the means of curtailing power use dramatically, the reflection type liquid crystal display is being intensively pursued.

The action modes of the reflection type liquid crystal display include DS (dynamic scattering) mode, ECB (electrically controlled birefringence) mode, GH (guest-host) mode, and others, and in certain types it is required to use a liquid crystal material with a negative value of $\Delta\in$ (dielectric constant anisotropy).

Hitherto known independent liquid crystal compounds with negative $\Delta\in$ values include:

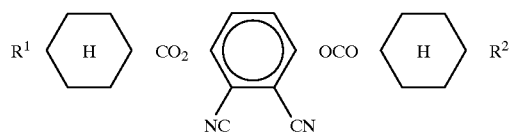

where $R^1$ and $R^2$ are represented by an alkyl or alkoxy group with each group having 1 to 10 carbon atoms (Japanese Patent Provisional Publication No. 61-26898),

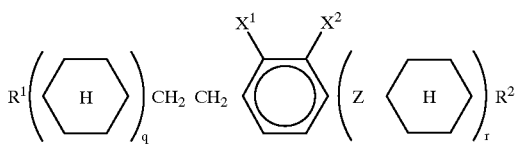

where $R^1$ and $R^2$ are an alkyl or alkoxy group with each group having 1 to 12 carbon atoms; the sum of q and r equals 1 or 2; Z represents a single bond, $CH_2CH_2$, $OCH_2$, $OCO$, or $CO_2$; $X^1$ and $X^2$ represent H, F, Cl, Br, or CN (Japanese Patent Provisional Publication No. 60-199840),

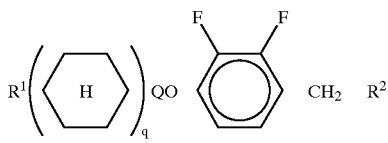

where $R^1$ and $R^2$ are non-substituted or substituted alkyl groups with each group having 1 to 15 carbon atoms, Q is CO or $CH_2$ (Japanese Patent Provisional Publication No. 2-503436), and other compounds having a partial structure with positions 2 and 3 of a 1,4-substituted phenylene group substituted by F, CN, etc., and other compounds having a partial structure with axial position of 1 or 4 of a 1,4-substituted cyclohexylene group substituted by F, CN such as

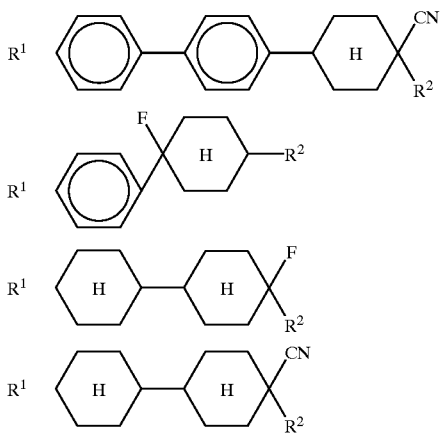

(Japanese Patent Provisional Publication No. 60-226835).

One of demerits of liquid crystal display is the narrowness of the viewing field angle. To improve this, various novel modes have been proposed. One of them is the in-plane switching mode. In this mode, the viewing field angle is excellent because it is extended to ±60 degrees both vertically and horizontally, but its shortcoming is the slow response speed. This is because it was forced to use Nn type liquid crystals ($\Delta\in<0$) of high viscosity.

SUMMARY OF THE INVENTION

We have already filed applications related to hitherto unknown liquid crystal compounds containing silacyclohexane rings in their molecular structure (see the list of the references at the end). The composition of the present invention relates to a mixture composed of one or more of these liquid crystal compounds only, or containing them as part of constituent components, having a negative $\Delta\in$ (dielectric constant anisotropy).

The composition of the invention comprises one or more compounds selected from the group consisting of formulas I to V below, and at least one compound thereof is composed of a compound containing trans-1-sila-1,4-cyclohexylene group or trans-4-sila-1,4-cyclohexylene group.

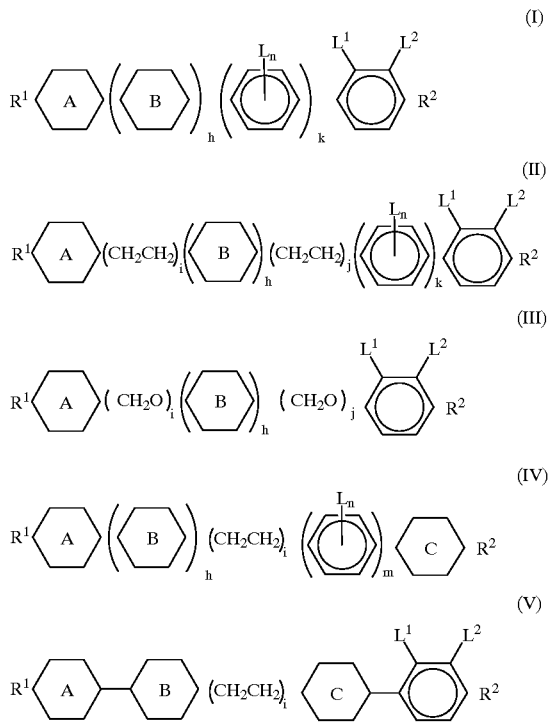

where $R^1$ is alkyl having 2–7 carbon atoms, respectively alkoxyalkyl having 2–7 carbon atoms, a mono- or difluoroalkyl having 2–7 carbon atoms, or an alkenyl having 2 to 7 carbon atoms; h, i, j, and k denote 0 or 1 with the proviso that i+j=1; m is 0, 1 or 2; a six-membered ring expressed by A, B, or C respectively represents any one of trans-1-sila-1,4-cyclohexylene, trans-4-sila-1,4-cyclohexylene, or trans-1,4-cyclohexylene group; L represents F; $L^1$ and $L^2$ represent H or F; n is 0, 1 or 2; and $R^2$ represents H, $R^1$ or $OR^1$.

The composition of the invention has a nematic liquid crystal phase over a wide temperature range, stability against moisture, air, light, heat, and electric field, and excellent compatibility with other liquid crystal compounds. Coincidentally, it possesses the following features as the effect of mixing one or more compounds having silacyclohexane ring in the molecular structure as components:

(1) Low Viscosity for High Speed Response

Conventional compounds having a partial structure

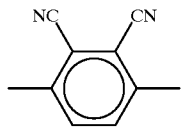

with positions 2, 3 of a 1,4-substituted phenylene group substituted by CN, and compounds having a partial structure

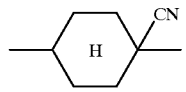

with axial position of 1 or 4 of a 1,4-substituted cyclohexylene group substituted by CN possessed a high viscosity of 70 to 200 cps, and were not suited for high speed response. Compounds in formulas I to V having a silacyclohexane ring in the molecular structure possesses a low viscosity of 10 to 70 cps, and by mixing them in accordance with the present invention it is possible to lower the viscosity of the composition and therefore raise the response speed.

(2) Low Threshold Voltage for Low Voltage Driving

Compounds having the partial structure

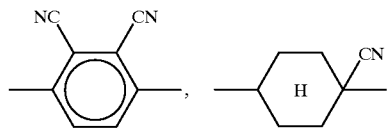

show large $|\Delta\in|$ values because the CN group has high polarity, and are therefore advantageous for lower driving voltages, but they have high viscosities and are not suited to obtain high speed responses as stated above.

Conventional compounds (not containing Si in their molecular structures) having a partial structure

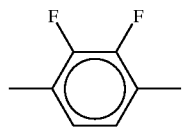

with positions 2, 3 of a 1,4-substituted phenylene group being replaced by F have relatively low viscosities, but $|\Delta\in|$ has been too small, as compared with compounds containing a CN group, to lower the driving voltage. Among formulas I to V, the compound having both the silacyclohexane ring and the above partial structure with positions 2 and 3 of a 1,4-substituted phenylene group substituted by F has larger $|\Delta\in|$ values by the effect of introducing silicon. Consequently, the liquid crystal composition of the present invention containing any of these can be driven at lower voltages.

(3) High Voltage Retention

Among operation modes of reflection type liquid crystal displays using a liquid crystal material with a negative $\Delta\in$ value, an active matrix system may be employed as the driving mode. In such a case, a signal voltage retention characteristic is required for maintaining good image display quality. This signal voltage retention characteristic means the degree of lowering of the signal voltage applied to the TFT pixels containing liquid crystal in a given frame period. Therefore, without lowering of the signal voltage, that is, when the voltage retention percentage is 100%, the configuration of liquid crystal molecules remains unbroken, and the contrast does not fade. This voltage retention characteristic is also affected by the environment in which a liquid crystal panel is used, and the period during which this characteristic to remains excellent tends to be shorter when exposed to high intensity light such as liquid crystal panels used for projection, or to high temperatures as liquid crystal panels in automobiles.

The liquid crystal composition of the invention possesses a high voltage retention percentage of over 98% even in the high temperature condition of 100° C. In particular, simultaneous satisfaction of both low threshold voltage and high voltage retention was difficult to obtain in the existing liquid crystal materials, and it used to be necessary to sacrifice one or the other to a certain extent.

Specific chemical structures of formula I are as follows.

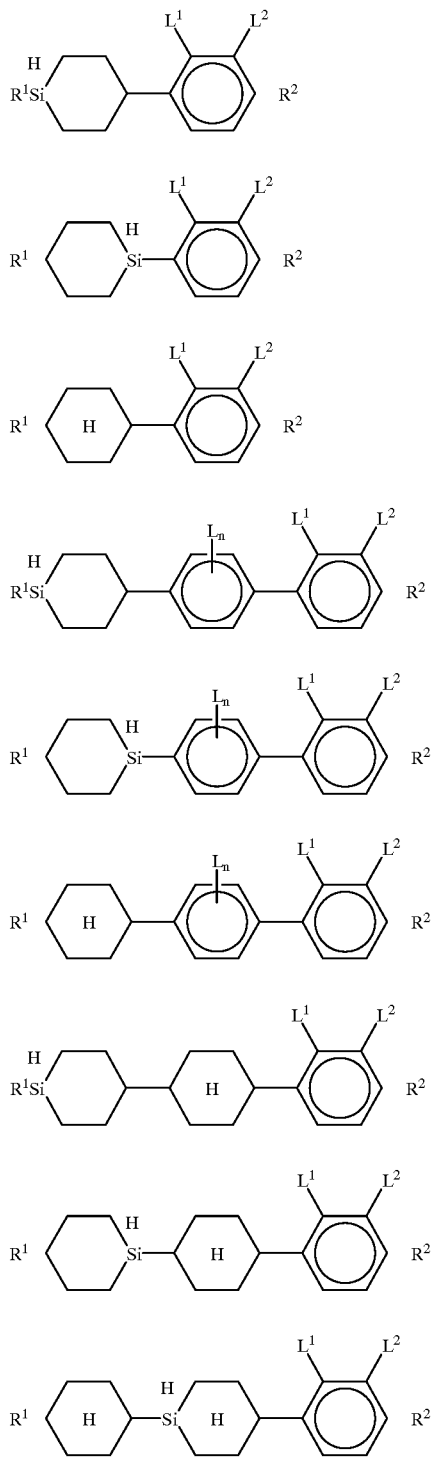

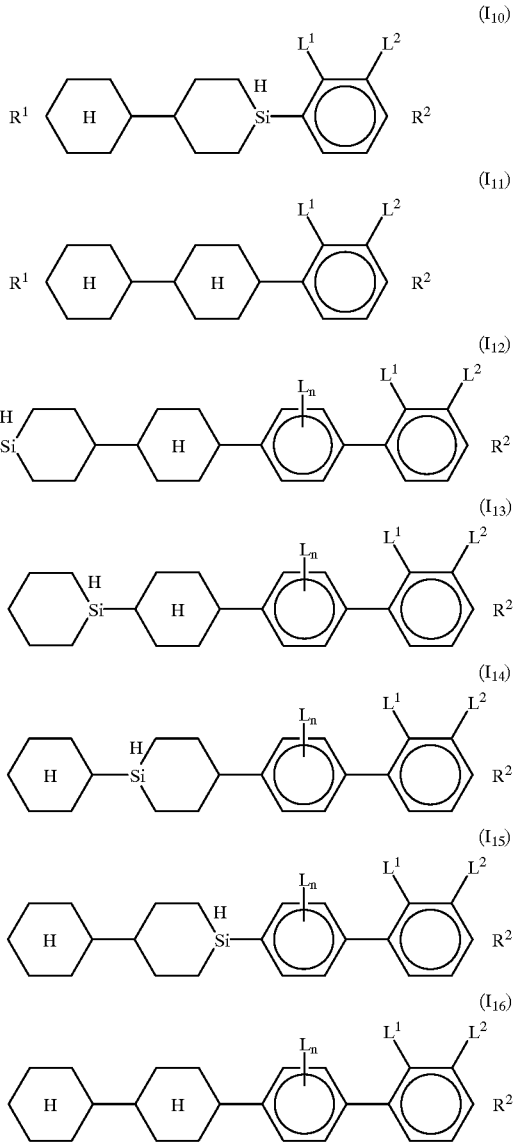

where $R^1$ denotes any one of the following groups:
(a) Alkyl groups with 2 to 7 carbon atoms, that is:
Ethyl group, n-propyl group, n-butyl group, n-pentyl group, n-hexyl group, or n-heptyl group;
(b) Alkoxy alkyl groups with 2 to 7 carbon atoms, that is:
Methoxymethyl group, 2-methoxyethyl group, 3-methoxypropyl group, 4-methoxybutyl group, 5-methoxypentyl group, 6-methoxyhexyl group, ethoxymethyl group, 2-ethoxyethyl group, 3-ethoxypropyl group, 4-ethoxybutyl group, 5-ethoxypentyl group, (n-propoxy)methyl group, 2-(n-propoxy)ethyl group, 3-(n-propoxy)propyl group, 4-(n-propoxy)butyl group, (n-butoxy)methyl group, 2-(n-butoxy)ethyl group, 3-(n-butoxy)propyl group, (n-pentoxy)methyl group, 2-(n-pentoxy)ethyl group, or (n-hexyloxy)methyl group.
(c) Mono- or difluoroalkyl groups with 2 to 7 carbon atoms, that is:
1-Fluoroethyl group, 1-fluoropropyl group, 1-fluorobutyl group, 1-fluoropentyl group, 1-fluorohexyl group, 1-fluoroheptyl group, 2-fluoroethyl group, 2-fluoropropyl group, 2-fluorobutyl group, 2-fluoropentyl group, 2-fluorohexyl group, 2-fluoroheptyl group, 3-fluoropropyl group, 3-fluorobutyl group, 3-fluoropentyl group, 3-fluorohexyl group, 3-fluoroheptyl group, 4-fluorobutyl group, 4-fluoropentyl group, 4-fluorohexyl group, 4-fluoroheptyl group, 5-fluoropentyl group, 5-fluorohexyl group, 5-fluoroheptyl group, 6-fluorohexyl group, 6-fluoroheptyl group, 7-fluoroheptyl group, 1,1-difluoroethyl group, 1,1-difluoropropyl group, 1,1-difluorobutyl group, 1,1-difluoropentyl group, 2,2-difluoroethyl group, 2,2-difluoropropyl group, 2,2-difluorobutyl group, 2,2-difluoropentyl group, 3,3-difluoropropyl group, 3,3-difluorobutyl group, 3,3-difluoropentyl group, 4,4-difluorobutyl group, 4,4-difluoropentyl group, or 5,5-difluoropentyl group.

(d) Alkenyl groups with 2 to 7 carbon atoms, that is:

Vinyl group, 1E-propenyl group, 1E-butenyl group, 1E-pentenyl group, 1E-hexenyl group, 1E-heptenyl group, 3-butenyl group, 3E-pentenyl group, 3E-hexenyl group, 3E-heptenyl group, 4-pentenyl group, 4E-hexenyl group, 4Z-hexenyl group, 4E-heptenyl group, 4Z-heptenyl group, 5-hexenyl group, 5E-heptenyl group, 5Z-heptenyl group, or 6-heptenyl group.

$R^2$ denotes H, $R^1$, or $OR^1$.

Specific examples of a partial skeleton

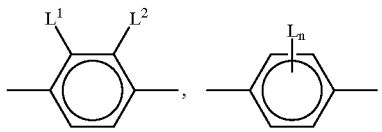

are as follows.

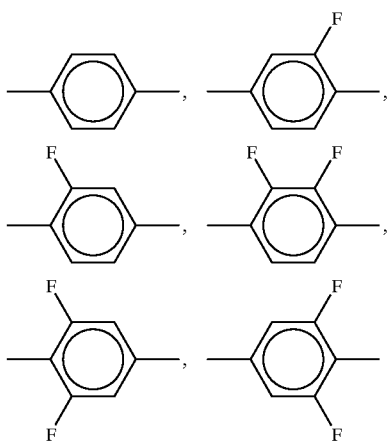

The configurations of silacyclohexane ring and cyclohexane ring are both trans form.

Specific examples of formula II are shown below.

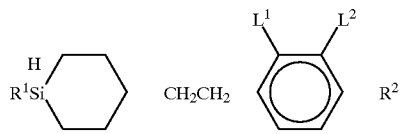

(II$_1$)

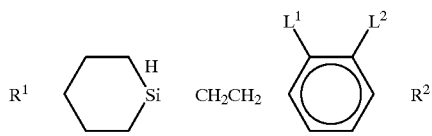

(II$_2$)

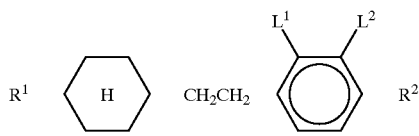

(II$_3$)

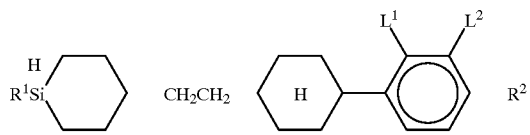

(II$_4$)

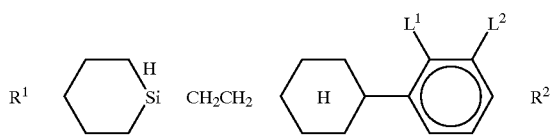

(II$_5$)

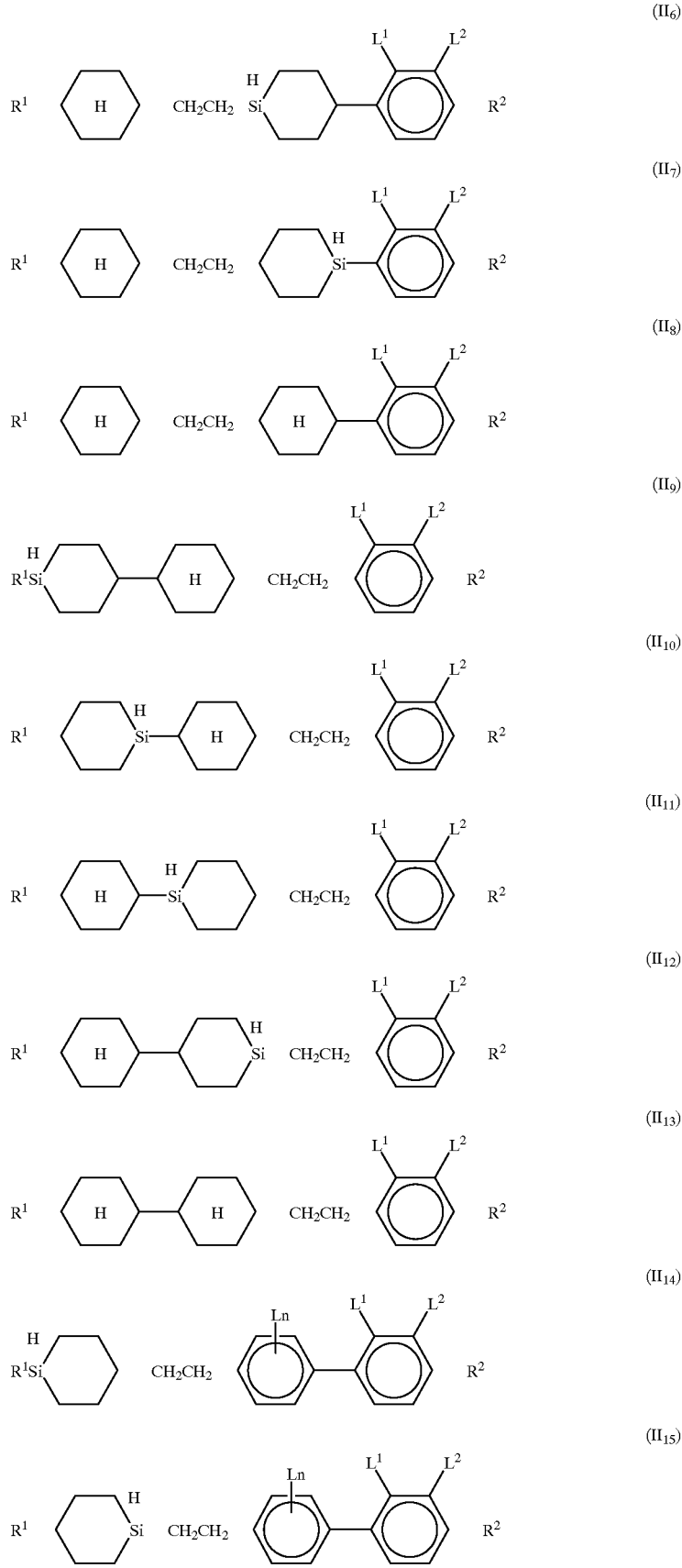

-continued
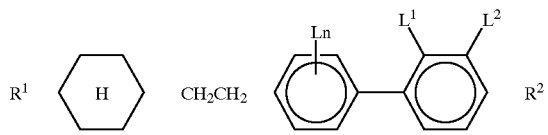
(II₁₆)
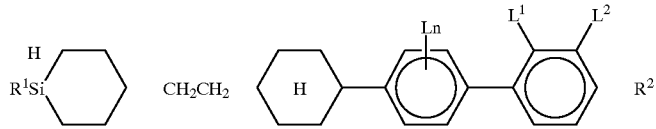
(II₁₇)
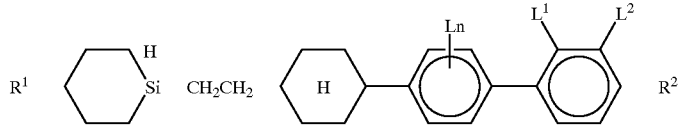
(II₁₈)
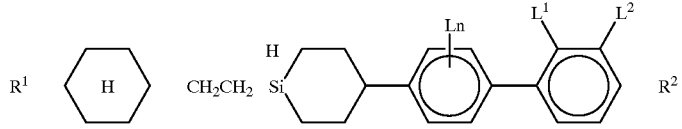
(II₁₉)
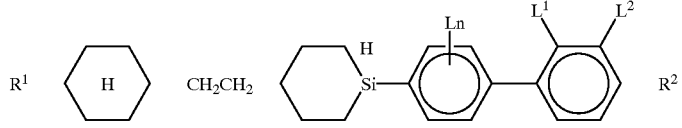
(II₂₀)
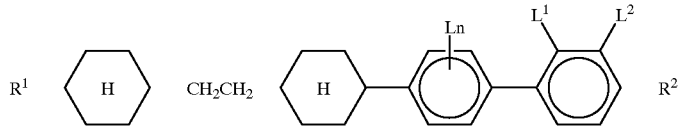
(II₂₁)
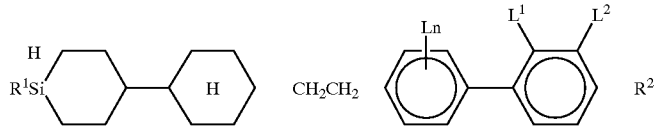
(II₂₂)
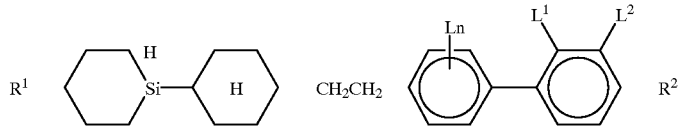
(II₂₃)
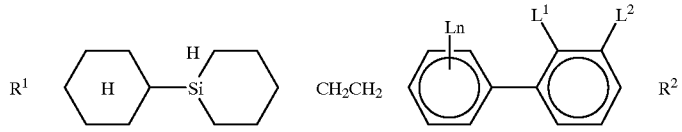
(II₂₄)
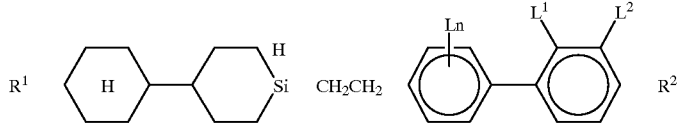
(II₂₅)

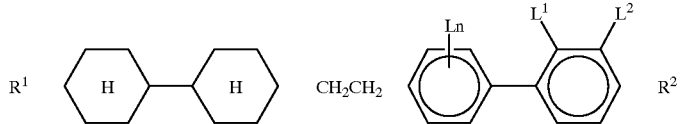
Specific examples of formula III are shown below.
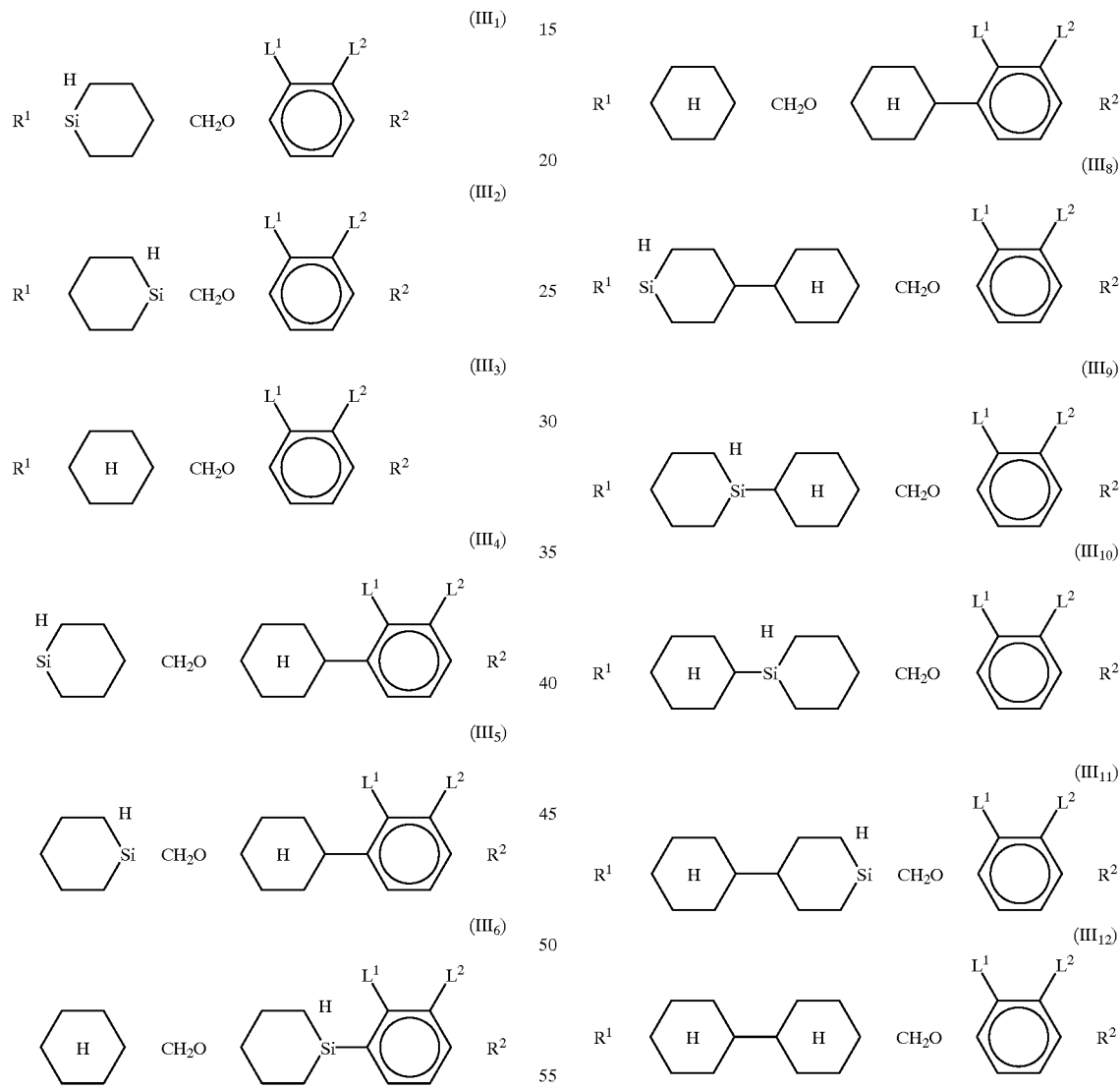
Specific examples of formula IV are shown below.

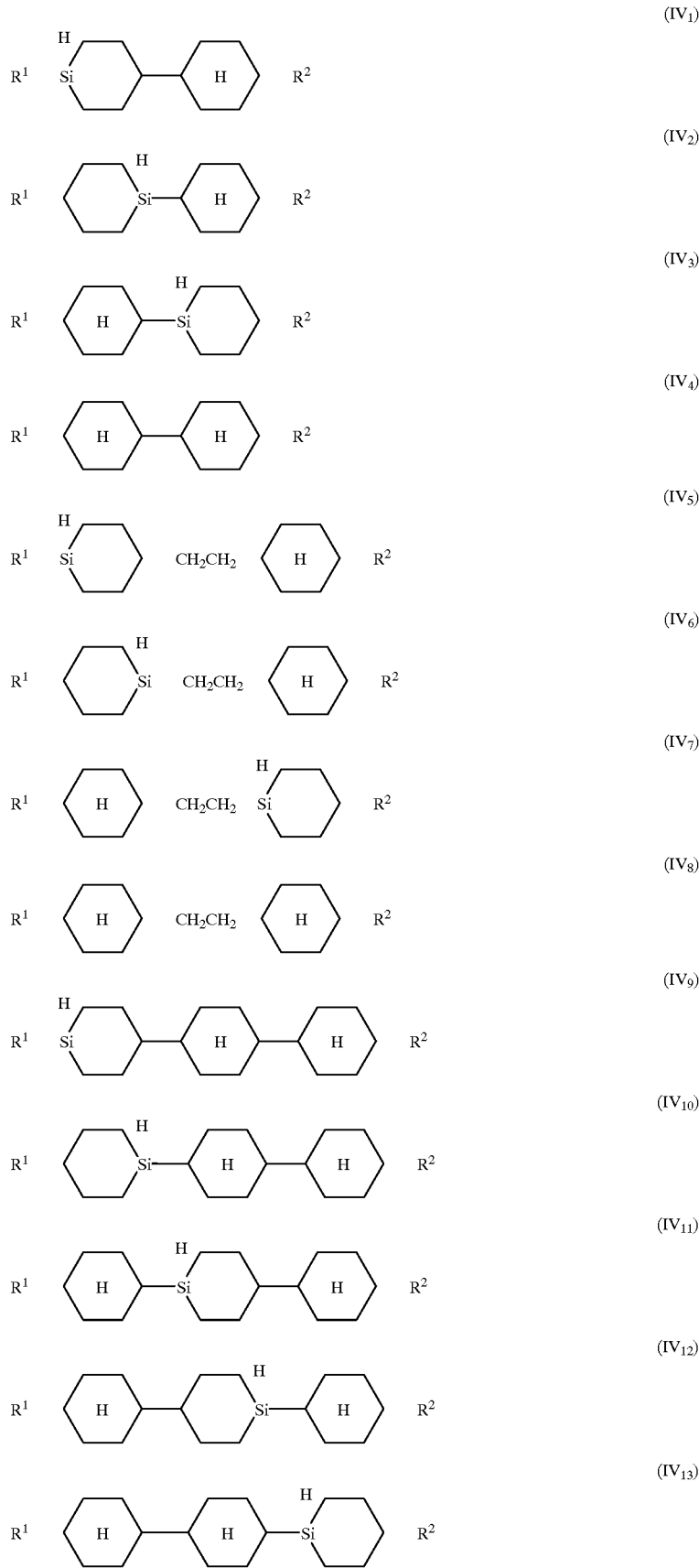

-continued
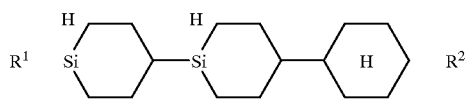
(IV₁₄)
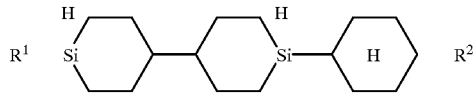
(IV₁₅)
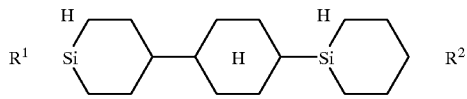
(IV₁₆)
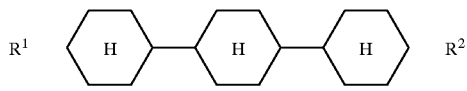
(IV₁₇)
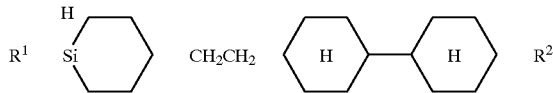
(IV₁₈)
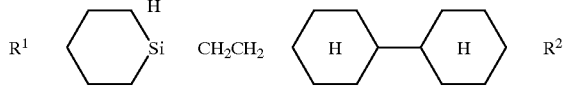
(IV₁₉)
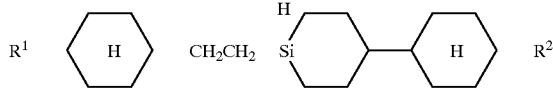
(IV₂₀)
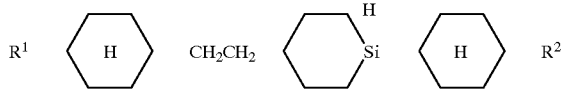
(IV₂₁)
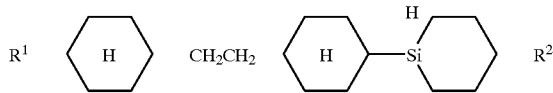
(IV₂₂)
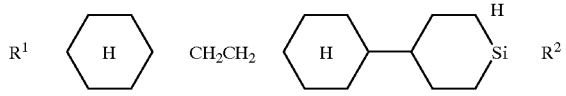
(IV₂₃)
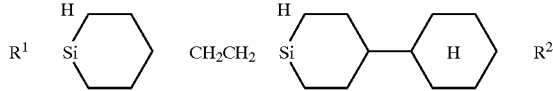
(IV₂₄)
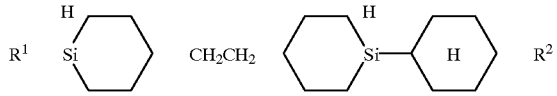
(IV₂₅)
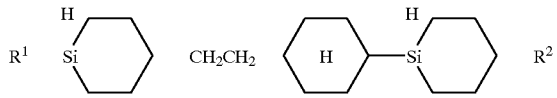
(IV₂₆)

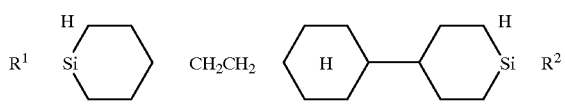
(IV27)
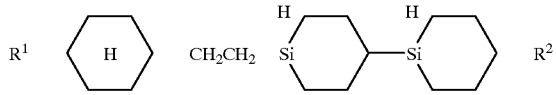
(IV28)
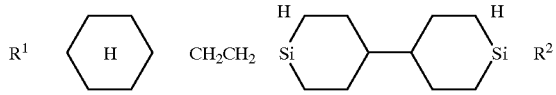
(IV29)
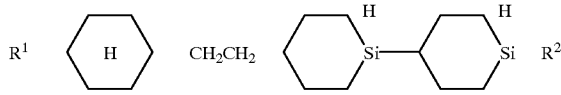
(IV30)
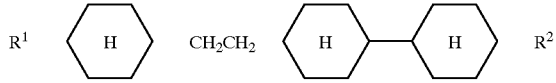
(IV31)
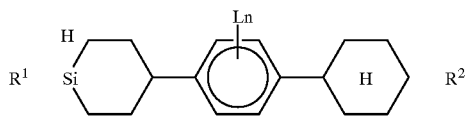
(IV32)
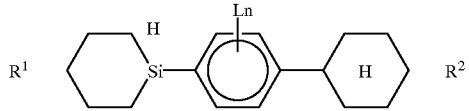
(IV33)
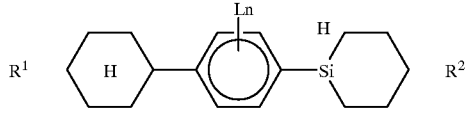
(IV34)
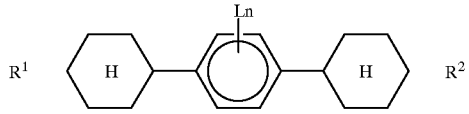
(IV35)
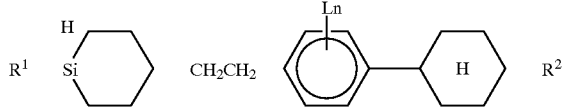
(IV36)
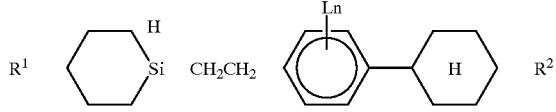
(IV37)
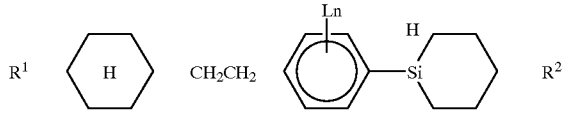
(IV38)

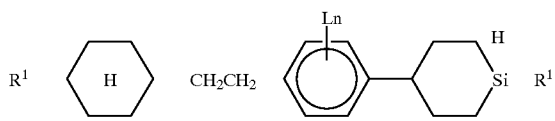
(IV39)
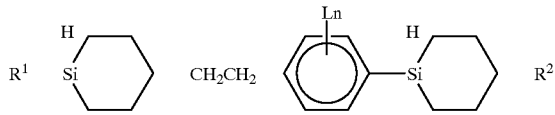
(IV40)
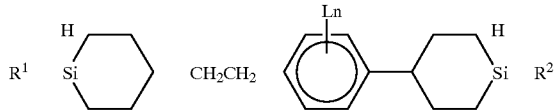
(IV41)
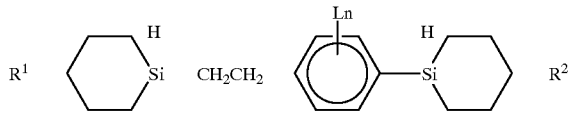
(IV42)
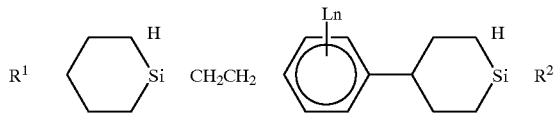
(IV43)
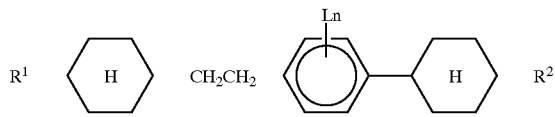
(IV44)
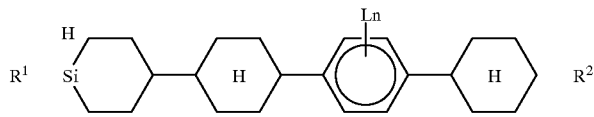
(IV45)
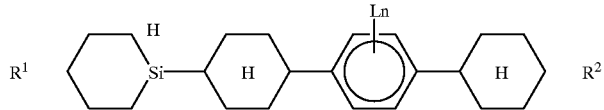
(IV46)
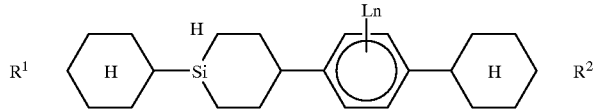
(IV47)
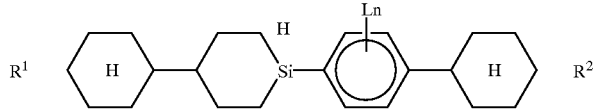
(IV48)
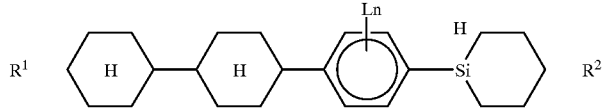
(IV49)

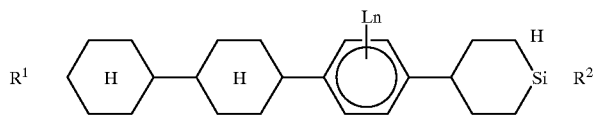
(IV50)
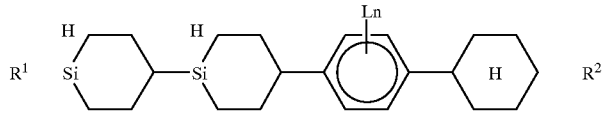
(IV51)
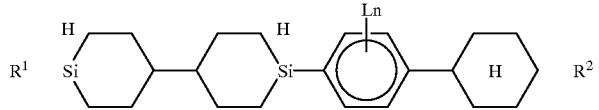
(IV52)
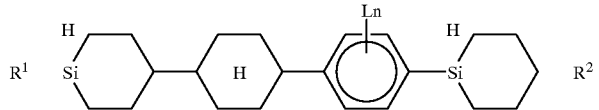
(IV53)
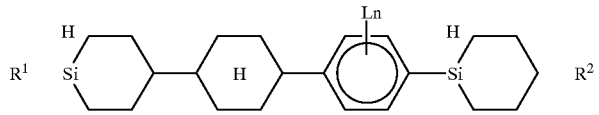
(IV54)
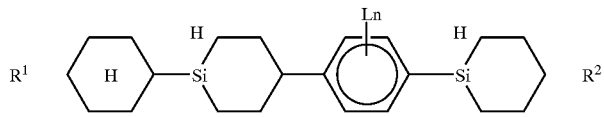
(IV55)
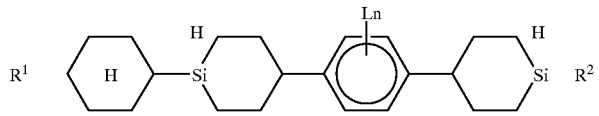
(IV56)
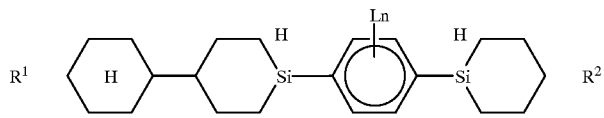
(IV57)
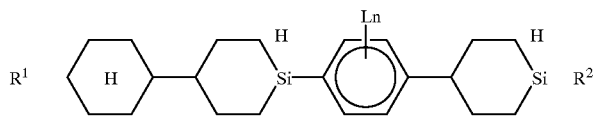
(IV58)
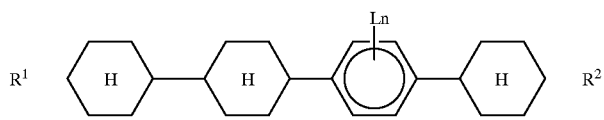
(IV59)
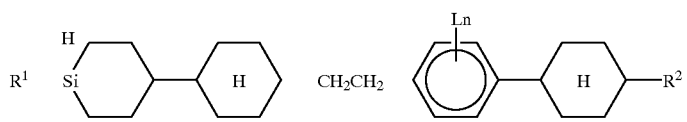
(IV60)

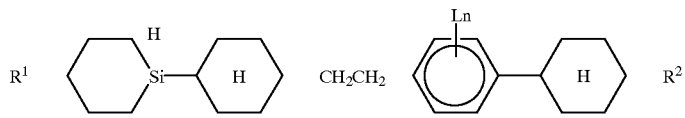
(IV61)
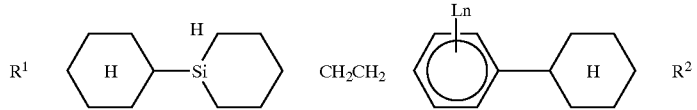
(IV62)
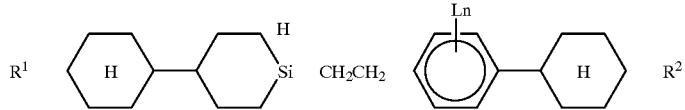
(IV63)
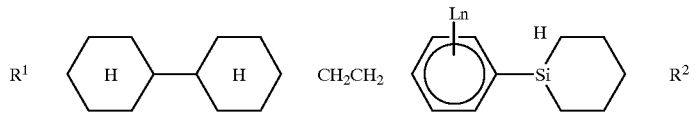
(IV64)
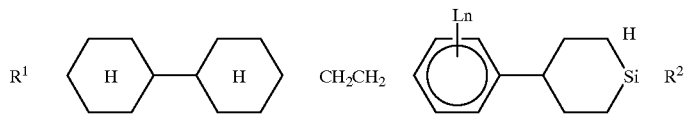
(IV65)
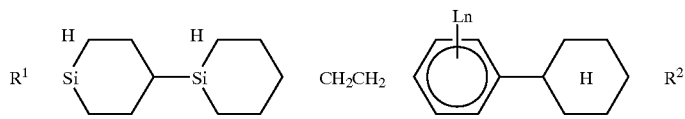
(IV66)
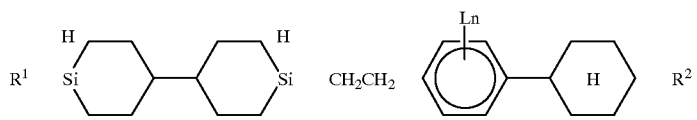
(IV67)
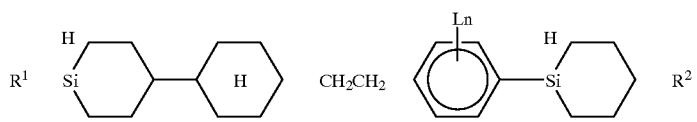
(IV68)
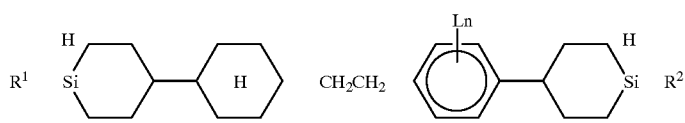
(IV69)
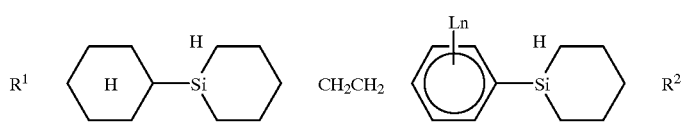
(IV70)
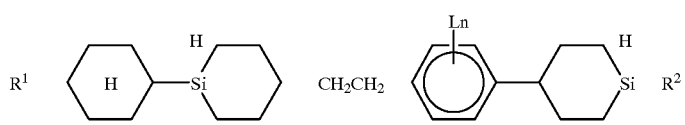
(IV71)

-continued
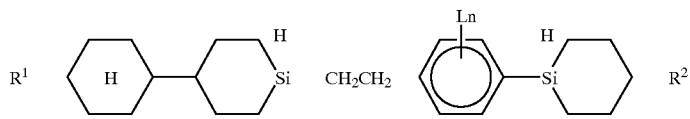 (IV72)
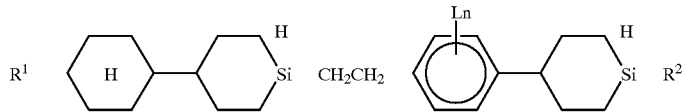 (IV73)
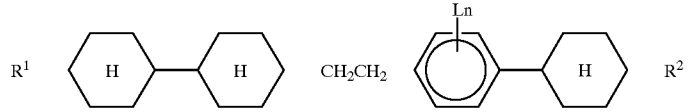 (IV74)
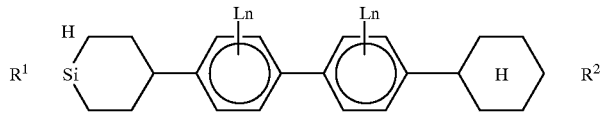 (IV75)
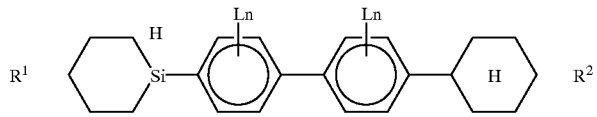 (IV76)
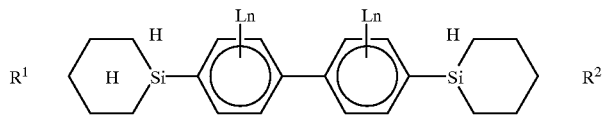 (IV77)
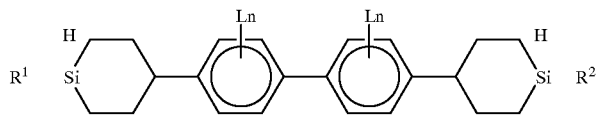 (IV78)
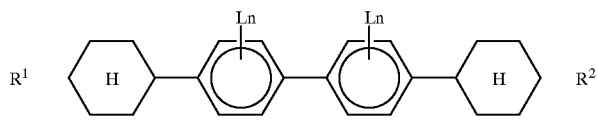 (IV79)
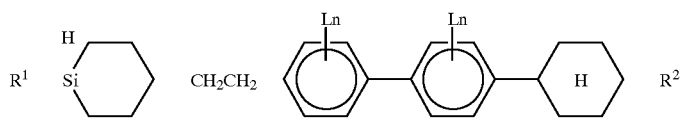 (IV80)
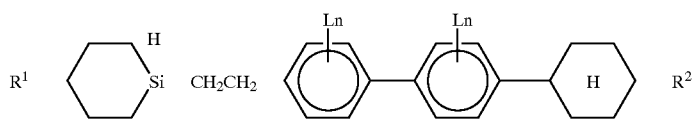 (IV81)
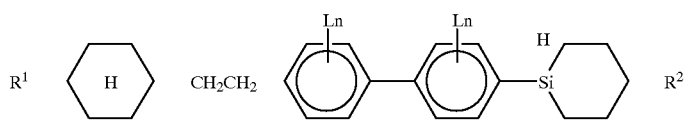 (IV82)

-continued
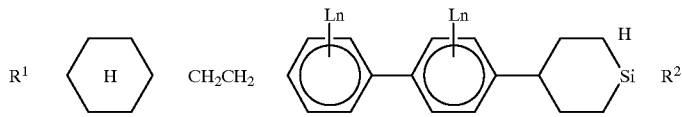
(IV83)
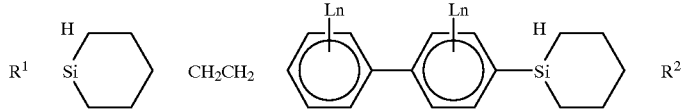
(IV84)
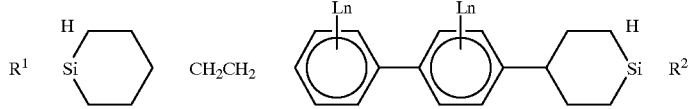
(IV85)
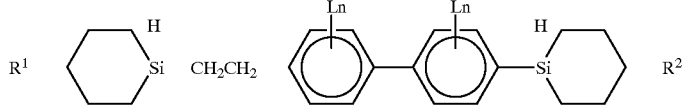
(IV86)
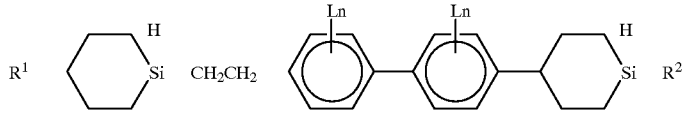
(IV87)
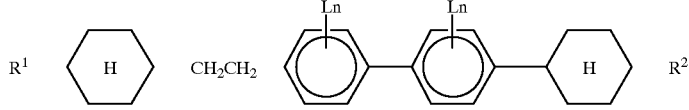
(IV88)
Specific examples of formula V are shown below.
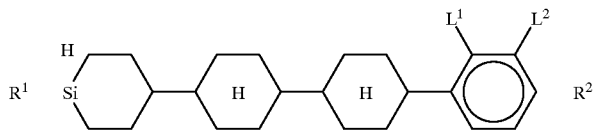
(V1)
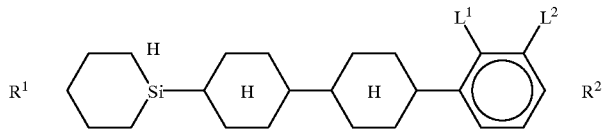
(V2)
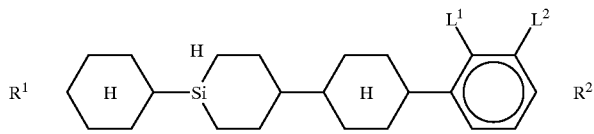
(V3)
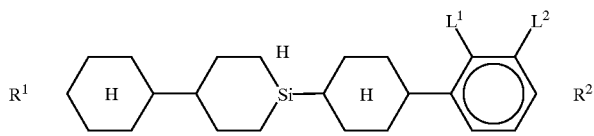
(V4)

(V5)
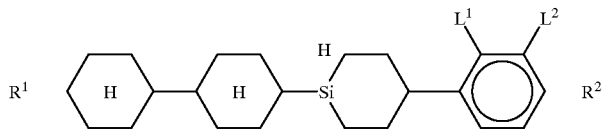
(V6)
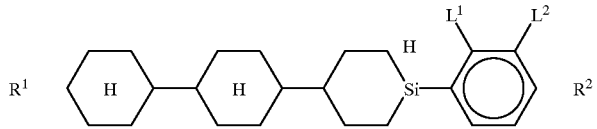
(V7)
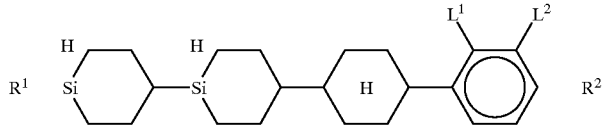
(V8)
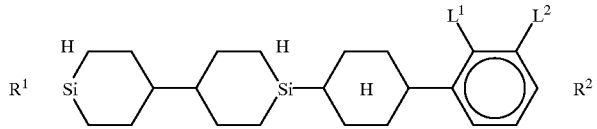
(V9)
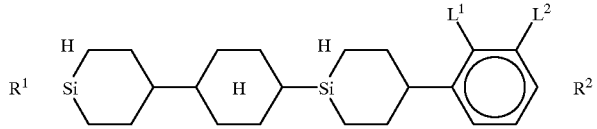
(V10)
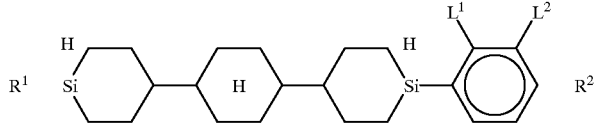
(V11)
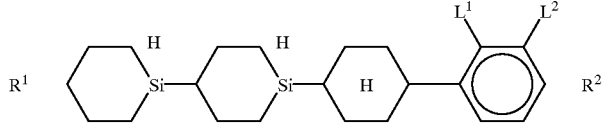
(V12)
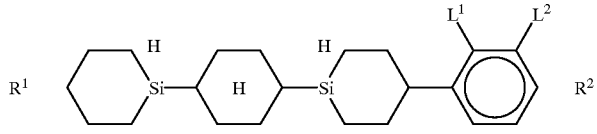
(V13)
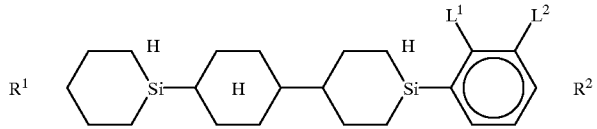
(V14)
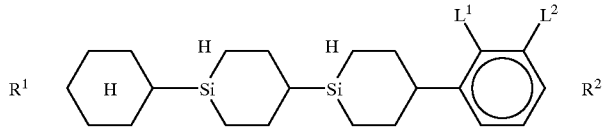

-continued
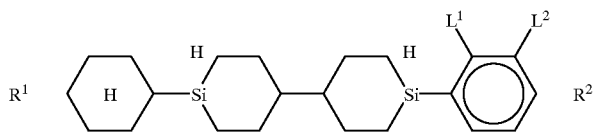
(V15)
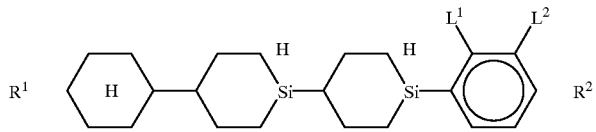
(V16)
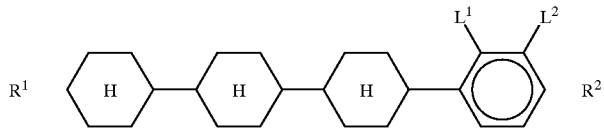
(V17)
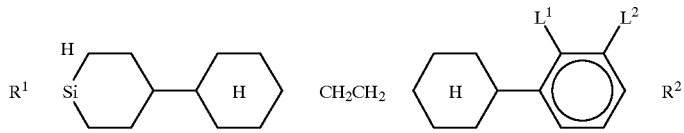
(V18)
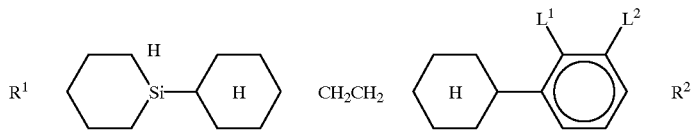
(V19)
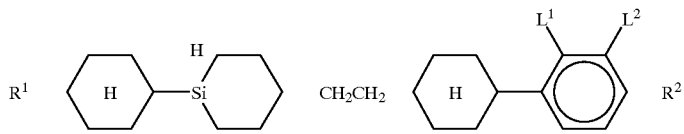
(V20)
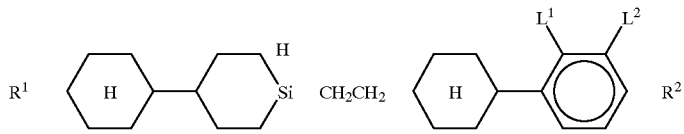
(V21)
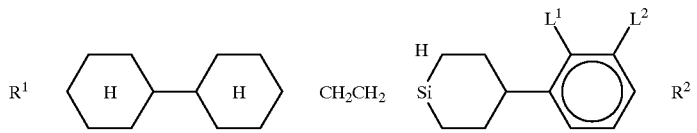
(V22)
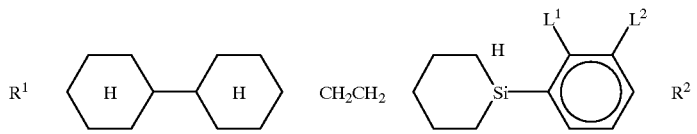
(V23)
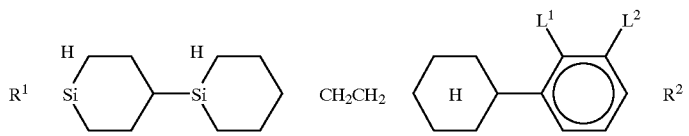
(V24)

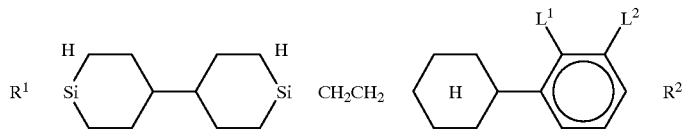
(V25)
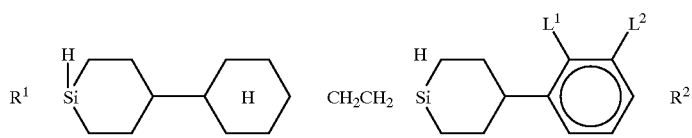
(V26)
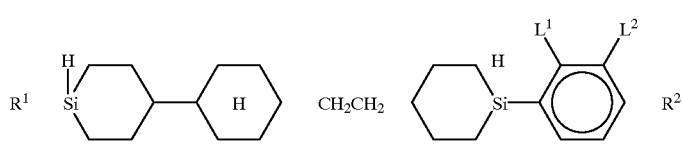
(V27)
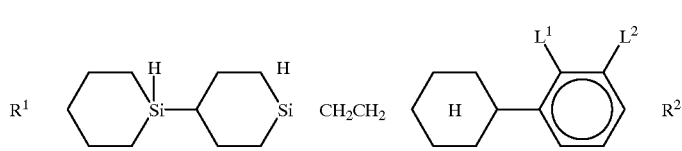
(V28)
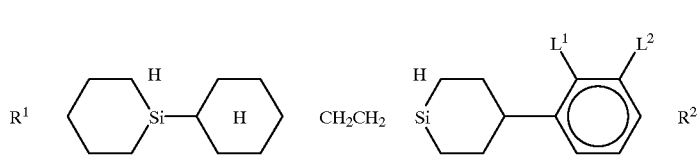
(V29)
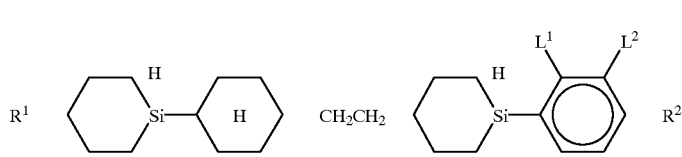
(V30)
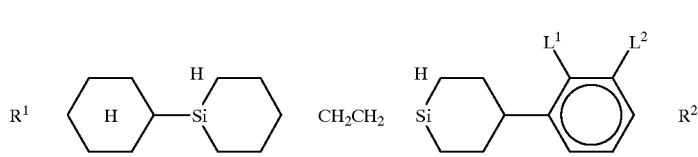
(V31)
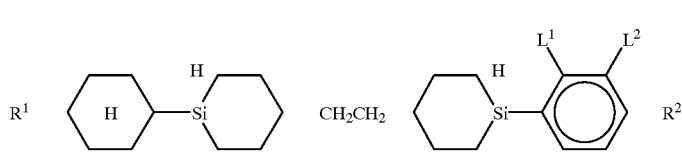
(V32)
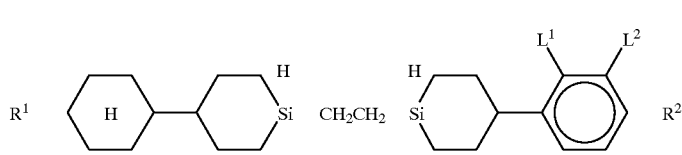
(V33)
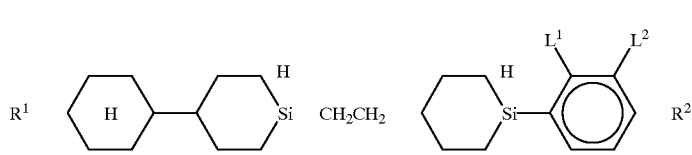
(V34)

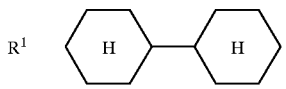 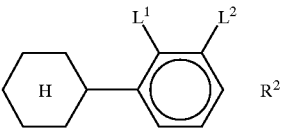

R[1] and R[2] for the formulas (II) to (V) are the same as those for the formula (I).

R[1] is preferably any one of the following groups:

(e) Alkyl groups with 2 to 7 carbon atoms, that is:
Ethyl group, n-propyl group, n-butyl group, n-pentyl group, n-hexyl group, or n-heptyl group;

(f) Of alkoxyalkyl groups with 2 to 7 carbon atoms:
Methoxymethyl group, 2-methoxyethyl group, 3-methoxypropyl group, 5-methoxypentyl group, ethoxymethyl group, 2-ethoxyethyl group, (n-propoxy)methyl group, or (n-pentoxy)methyl group;

(g) Of mono- or difluoroalkyl groups with 2 to 7 carbon atoms:
2-Fluoroethyl group, 2-fluoropropyl group, 4-fluorobutyl group, 5-fluoropentyl group, 6-fluorohexyl group, 7-fluoroheptyl group, 1,1-difluoroethyl group, 2,2-difluoroethyl group, 2,2-difluoropropyl group, 2,2-difluorobutyl group, 4,4-difluorobutyl group, or 4,4-difluoropentyl group;

(h) Of alkenyl groups with 2 to 7 carbon atoms:
Vinyl group, 1E-propenyl group, 1E-butenyl group, 1E-pentenyl group, 1E-hexenyl group, 1E-heptenyl group, 3-butenyl group, 3E-pentenyl group, 3E-hexenyl group, 3E-heptenyl group, 4-pentenyl group, 4E-hexenyl group, 4Z-hexenyl group, 4E-heptenyl group, 4Z-heptenyl group, 5-hexenyl group, or 6-heptenyl group.

As for the partial skeleton,

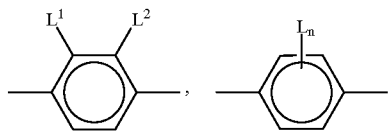

the following may be preferable:

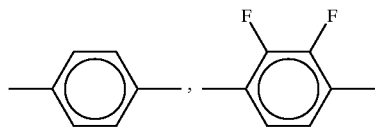

That is, for low voltage driving, the following is preferred:

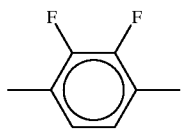

and as for high speed response, the following is preferred:

As for the ring structure, $I_{1, 3, 4, 6, 7, 9, 10, 11, 12, 14, 16}$, $II_{1, 3, 4, 8, 9, 11, 13, 14, 16, 17, 21, 22, 24, 26}$, $III_{1, 3, 4, 7, 8, 10, 12}$, $IV_{1, 4, 5, 8, 9, 11, 12, 17, 18, 21, 23, 31, 32, 35, 36, 39, 44, 45, 47, 50, 59, 60, 62, 65, 74, 75, 78, 79, 80, 83, 85, 88}$, and $V_{1, 3, 5, 17, 18, 20, 35}$ are preferred because the liquid crystal temperature range is wide, and they are easier to manufacture than the others.

The mixing ratio of these components in the liquid crystal composition is described below:

Group A, composed of one or more compounds selected from the compounds expressed in formulas $I_{1-3}$, $II_{1-3}$, and $IV_{1-8}$, is added by 0 to 30 mol %; group B, composed of one or more compounds selected from the compounds expressed in formulas $I_{4-11}$, $II_{4-16}$, $III_{4-12}$, and $IV_{9-44}$, by 50 to 100 mol %, and group C composed of one or more compounds selected from the compounds expressed in formulas $I_{12-16}$, $II_{17-26}$, $IV_{45-88}$, and $V_{1-35}$, by 0 to 20 mol %. More preferably, group A is added by 2 to 20 mol %, group B by 70 to 96 mol %, and group C by 2 to 10 mol %.

It is preferable to add one or more of silacyclohexane compounds with a portion of 10 mol % or more in total. According to the present invention, the larger $|\Delta\epsilon|$ values and higher voltage retention can be obtained by increasing the portion of one or more silacyclohexane compounds.

When the fraction of group A is excessive, it is advantageous for high speed responses, but the upper limit temperature of the nematic phase drops and the liquid crystal range becomes narrower. To the contrary, when the fraction of group A is insufficient, the response speed drops. Within group A, $L^1=L^2=F$ is more advantageous for lower threshold voltages, and $L^1=L^2=H$ is more advantageous for higher response speeds.

Within group B, $L^1=L^2=F$ is more advantageous for lower threshold voltages, but if its fraction is excessive, although the threshold voltage may be further lowered by increasing $|\Delta\epsilon|$, the viscosity climbs up, making it disadvantageous for high speed responses. For high speed responses and elevation of upper the limit temperature of the nematic phase, $L^1=L^2=H$ is more advantageous within group B, but when its fraction is excessive, the threshold voltage will be raised by decreasing $|\Delta\epsilon|$.

By using group B only or by optimizing the ratio between group A and group B, it is possible to form a liquid crystal composition, but when it is desired to expand the nematic phase to higher temperatures, group C is added. However, when the ratio of group C is excessive, it is disadvantageous for high speed responses, low threshold voltages, and stability of nematic phase at low temperatures.

To control the refractive index anisotropy (Δn) which influences the viewing angle characteristic, increasing the added amount of compounds of general formula $I_{1-31}$, can decreased, and AΔ increasing the added amount of compounds of general formulas $I_{4-6}$, $I_{12-16}$, $II_{14-26}$, and $IV_{75-88}$, can increase AΔ.

Recently, applications of liquid crystal panels are expanding, and the properties required of them have diversified depending on the end use, for example office automation, automobile, and portable use. It is possible to satisfy these individual requirements, by selecting types and amounts of the compounds expressed by formulas I to VI, and mixing them to find optimum values of various characteristics for specific applications.

To mix these components, desired amounts of minor components are added to main components, and all are heated to dissolve them. Alternatively, each component is dissolved in an organic solvent such as acetone, methanol or chloroform and combined with the other components, with the organic solvent subsequently being evaporated.

The liquid crystal composition of the present invention thus obtained has a nematic liquid crystal phase in a wide temperature range from the nematic phase lower limit temperature of −20° C. or less to the upper limit temperature of 70 to 100° C. Even when stored for a long period at −20° C., the smectic phase or crystallinity do not occur, and the voltage retention percentage measured at 100° C. is over 98%.

In the liquid crystal composition of the present invention used in a liquid crystal display element, a multichroic pigment such as azo compounds and anthraquinones may be added for forming the coloring guest-host system. For example, a dichroic pigment may be added to the liquid crystal composition of the present invention to be used in a cell of the phase-transition type guest-host mode.

The dichroic pigment used with the present invention is preferably azo compounds or anthraquinones, and more preferably, a dichroic pigment such as azo pigments expressed by the following formula:

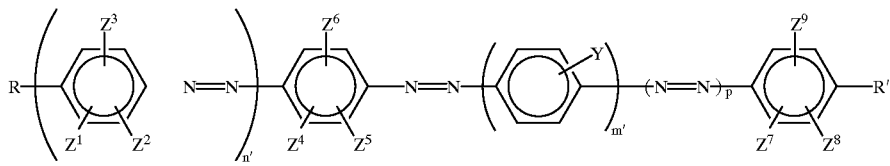

where R and R' are a substituted or non-substituted alkyl group or a dialkylamino group, and if R or R' is a substituted alkyl group, then it is substituted by plural fluorine atoms or a group in which a —CH$_2$— moiety which is not located next to another —CH$_2$— moiety by O, S, NH, SO$_2$, O$_2$C,

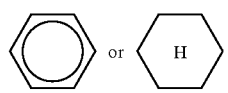

specifically; $Z^1$ through $Z^9$ represent hydrogen, methyl group, methoxy group, or halogen group; $Z^1$ and $Z^2$, $Z^4$ and $Z^5$, and $Z^7$ and $Z^8$ may be mutually bonded to form an aliphatic ring, aromatic ring, or nitrogen-containing aromatic ring; Y denotes a fluoroalkyl group; n' is 0, 1, or 2; m' is 0, 1, 2; p equals 0 or 1, but has to be 0 in case of m'=0; or an anthraquinone type pigment expressed by the following formula:

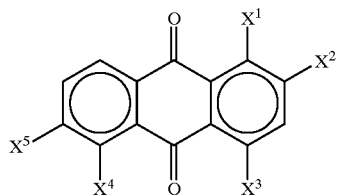

where $X^1$ to $X^5$ are H, OH, halogen, CN, a non-substituted or substituted amino group, non-substituted or substituted carboxylic acid ester, a non-substituted or substituted phenoxy group, a non-substituted or substituted benzyl group, a non-substituted or substituted phenyl thio group, a non-substituted or substituted phenyl group, a non-substituted or substituted cyclohexyloxy carbonyl group, or a non-substituted or substituted pyridyl or pyrimidyl group. The dichroic pigment is preferably added by 0.2 to 3 wt. % to the liquid crystal composition.

Furthermore, other additives, such as chiral doping agents to give torsion direction and strength, may be added to the liquid crystal compositions. The liquid crystal composition containing such additives is sealed between transparent substrates on which active elements such as TFT or MIN or simple matrix electrodes are disposed, to be used in a liquid crystal display element. This element, if necessary, may also possess various undercoats or overcoats for controlling orientation, such as a polarizer, a filter, a reflection layer and others. Moreover, the element may be also used as a multilayer cell, or combined with other display elements. Further, such an element may incorporate semiconductor substrates and may be combined with a light source.

The liquid crystal composition of the present invention is characterized by negative values for the dielectric constant anisotropy (Δ∈), its absolute value |Δ∈| being larger than that of the composition composed of conventional liquid crystal compounds alone, high voltage retention, and relatively low viscosity.

Accordingly, the liquid crystal composition of the present invention provides a liquid crystal material suited for the reflection type liquid crystal display without back light, in particular, the GH (guest-host) mode panel to which multichroic pigments of azo compounds or anthraquinones are added and the ECB (electrically controlled birefringence) mode panel.

DETAILED DESCRIPTION OF PREFERRED EMBODIMENTS

The present invention is more specifically described below by referring to practical examples. In the examples, the characteristics of mixtures were measured in the following conditions. The definitions of symbols are also given below.

$T_{NI}$=nematic-isotropic transition temperature
Δ∈=dielectric constant anisotropy The dielectric constant anisotropy is given by a difference between the dielectric constant ($\epsilon_{//}$) measured for homeotropic orientation, and the dielectric constant ($\epsilon\perp$) measured by homogeneous orientation, under the conditions of measuring temperature of 25° C., with a measuring voltage of 0 to 20 Vrms, and at a frequency of 1 kHz.

Δn=refractive index anisotropy

The refractive index anisotropy is given by a difference between the abnormal light refractive index $n_{//}$ measured by mounting a sample on a prism of homeotropic orientation and the ordinary light refractive index n⊥ using an Abee's refractometer under the conditions of a measuring temperature of 25° C. and a wavelength of 589.3 nm.

In the following, the percentage values for mixture compositions refer to mol %.

EXAMPLE 1

A liquid crystal mixture consisting of:

4-(trans-4-(trans-4-n-propyl-4-silacyclohexyl) cyclohexyl)-2,3-difluoro-1-ethoxybenzene 36.8%, trans-4-(trans-4-(2,3-difluoro-4-ethoxyphenoxymethyl) cyclohexyl)-1-n-propyl-1-silacyclohexane 30.8%, and trans-4-(trans-4-(2,3-difluoro-4-ethoxyphenoxy methyl) cyclohexyl)-1-n-pentyl-1-silacyclohexane 32.4% shows the following properties.

$T_{NI}$=124.7° C., Δ∈=−8.9, Δn=0.101

In the chemical structures of the above-listed compounds, the compound having silicon atoms replaced by carbon atoms, show the following properties (Δ∈) as pure compounds:

Δ∈=−4.4 for 4-(trans-4-(trans-4-n-propylcyclohexyl) cyclohexyl)-2,3-difluoro-1-ethoxybenzene.

Δ∈=−6.0 for trans-4-(trans-4-(2,3-difluoro-4-ethoxyphenoxymethyl)cyclohexyl)-1-n-propylcyclohexane.

Thus, the mixed composition of the above three compounds possesses a negative dielectric constant anisotropy (Δ∈) having the larger absolute value than the respective values for two pure compounds, and presents the intended effects of the present invention.

EXAMPLE 2

A liquid crystal composition consisting of:

trans-4-(2-(p-ethoxyphenyl)ethyl)-1-n-propylcyclohexane 5.0%, trans-4-(2-(p-ethoxyphenyl)ethyl)-1-n-pentylcyclohexane 5.0%, trans-4-(2,3-difluoro-4-ethoxyphenoxymethyl)-1-n-pentyl-1-silacyclohexane 10.0%, trans-4-(2,3-difluoro-4-ethoxyphenoxymethyl)-1-n-heptyl-1-silacyclohexane 10.0%, trans-4-(trans-4-(2,3-difluoro-4-ethoxyphenoxymethyl) cyclohexyl)-1-n-propyl-1-silacyclohexane 18.0%, trans-4-(trans-4-(2,3-difluoro-4-ethoxyphenoxymethyl) cyclohexyl)-1-n-pentyl-1-silacyclohexane 18.0%, 4-(trans-4-(trans-4-n-propyl-4-silacyclohexyl) cyclohexyl)-2,3-difluoro-1-ethoxybenzene 14.0%, 4-(trans-4-(trans-4-n-pentyl-4 -silacyclohexyl) cyclohexyl)-2,3-difluoro-1-ethoxybenzene 14.0%, trans,trans-2-fluoro-4,4'-di(4-n-propylcyclohexyl) biphenyl 2.0%, trans,trans-2-fluoro-4-(4-n-pentylcyclohexyl)-4'-(n-propylcyclohexyl)biphenyl 2.0%, and trans,trans-2-fluoro-4,4'-di(4-n-pentylcyclohexyl) biphenyl 2.0% shows the following properties.

$T_{NI}$=109.3° C., Δ∈=−5.3, Δn=0.107.

EXAMPLE 3

A liquid crystal composition consisting of:

trans,trans-4-(4-n-propoxycyclohexyl)-1-n-propyl-1-silacyclohexane 20.0%, trans,trans-4-(4-ethoxycyclohexyl)-1-n-pentyl-1-silacyclohexane 5.0%, 4-(trans-4-(trans-4-n-propyl-4-silacyclohexyl) cyclohexyl)-2,3-difluoro-1-ethoxybenzene 12.5%, 4-(trans-4-(trans-4-n-pentyl-4-silacyclohexyl) cyclohexyl)-2,3-difluoro-1-ethoxybenzene 12.5%, trans-4-(trans-4-(2,3-difluoro-4-ethoxyphenoxymethyl) cyclohexyl)-1-n-propyl-1-silacyclohexane 25.0%, and trans-4-(trans-4-(2,3-difluoro-4-ethoxyphenoxymethyl) cyclohexyl)-1-n-pentyl-1-silacyclohexane 25.0% shows the following properties.

$T_{NI}$=94.9° C., Δ∈=−6.9, Δn=0.093.

EXAMPLE 4

A liquid crystal composition consisting of:

trans,trans-4-(4-n-propoxycyclohexyl)-1-n-propyl-1-silacyclohexane 12.0%, trans,trans-4-(4-ethoxycyclohexyl)-1-n-pentyl-1-silacyclohexane 3.0%, 4-(trans-4-n-pentyl-4-silacyclohexyl)-2,3-difluoro-1-ethoxybenzene 7.5%, 4-(trans-4-n-heptyl-4-silacyclohexyl)-2,3-difluoro-1-ethoxybenzene 7.5%, trans-4-(2-(trans-4-(2,3-difluoro-4-ethoxyphenyl) cyclohexyl)ethyl)-1-n-propyl-1-silacyclohexane 23.3%, trans-4-(2-(trans-4-(2,3-difluoro-4-ethoxyphenyl) cyclohexyl)ethyl)-1-n-pentyl-1-silacyclohexane 23.3%, 4'-(trans-4-n-propyl-4-silacylohexyl)-2,3-difluoro-4-ethoxybiphenyl 11.7%, and 4'-(trans-4-n-pentyl-4-silacylohexyl)-2,3-difluoro-4-ethoxybiphenyl 11.7% shows the following properties.

$T_{NI}$=87.0° C., Δ∈=−6.2, Δn=0.105.

EXAMPLE 5

A liquid crystal composition consisting of:

trans,trans-4-(4-n-propylcyclohexyl)-1-n-propylcyclohexane 8.0%, trans,trans-4-(4-n-propoxycyclohexyl)-1-n-propylcyclohexane 8.0%, trans,trans-4-(4-methoxycyclohexyl)-1-n-pentylcyclohexane 8.0%, 4-(trans-4-(trans-4-n-propyl-4-silacyclohexyl) cyclohexyl)-2,3-difluoro-1-ethoxybenzene 20.0%, 4-(trans-4-(trans-4-n-pentyl-4-silacyclohexyl) cyclohexyl)-2,3-difluoro-1-ethoxybenzene 20.0%, trans-4-(trans-4-(2,3-difluoro-4-ethoxyphenoxymethyl) cyclohexyl)-1-n-propylcyclohexane 18.0%, and trans-4-(trans-4-(2,3-difluoro-4-n-pentylphenoxymethyl) cyclohexyl)-1-n-propylcyclohexane 18.0% shows the following properties.

$T_{NI}$=114.7° C., $\Delta\varepsilon$=−4.9, $\Delta n$=0.095.

EXAMPLE 6

A liquid crystal composition consisting of:

trans-4-(2-(4-ethoxyphenyl)ethyl)-1-n-pentyl-1-silacyclohexane 7.5%, trans-4-(2-(4-ethoxyphenyl)ethyl)-1-n-heptyl-1-silacyclohexane 7.5%, trans-4-(2,3-difluoro-4-ethoxyphenoxymethyl)-1-n-pentyl-1-silacyclohexane 7.5%, trans-4-(2,3-difluoro-4-ethoxyphenoxy methyl)-1-n-heptyl-1-silacyclohexane 7.5%, 4-(trans-4-(trans-4-n-propyl-4-silacyclohexyl) cyclohexyl)-2,3-difluoro-1-ethoxybenzene 10.7%, 4-(trans-4-(trans-4-n-pentyl-4-silacyclohexyl) cyclohexyl)-2,3-difluoro-1-ethoxybenzene 10.7%, trans-4-(trans-4-(2,3-difluoro-4-ethoxyphenoxymethyl) cyclohexyl)-1-n-propyl-1-silacyclohexane 21.3%, trans-4-(trans-4-(2,3-difluoro-4-ethoxyphenoxymethyl) cyclohexyl)-1-n-pentyl-1-silacyclohexane 21.3%, trans,trans-2-fluoro-4-(4-n-propyl-4-silacyclohexyl)-4'-(4-n-propylcyclohexyl)biphenyl 2.0%, trans,trans-2-fluoro-4-(4-n-pentyl-4-silacyclohexyl)-4'-(4-n-propylcyclohexyl)biphenyl 2.0%, and trans,trans-2-fluoro-4-(4-n-pentyl-4-silacyclohexyl)- 4'-(4-n-pentylcyclohexyl)biphenyl 2.0% shows the following properties.

$T_{NI}$=86.1° C., $\Delta\varepsilon$=−6.8, $\Delta n$=0.103.

EXAMPLE 7

A liquid crystal composition consisting of:

trans-4-(2-(2,3-difluoro-4-ethoxyphenyl)ethyl)-1-n-pentylcyclohexane 10.0%, trans-4-(2-(2,3-difluoro-4-ethoxy phenyl)ethyl)-1-n-heptylcyclohexane 10.0%, trans-4-(trans-4-(2,3-difluoro-4-ethoxyphenoxymethyl) cyclohexyl)-1-n-propyl-1-silacyclohexane 23.0%, trans-4-(trans-4-(2,3-difluoro-4-ethoxyphenoxymethyl) cyclohexyl)-1-n-pentyl-1-silacyclohexane 23.0%, 4-(trans-4-(trans-4-n-propylcyclohexyl)cyclohexyl)-2,3-difluoro-1-ethoxybenzene 17.0%, and 4-(trans-4-(trans-4-n-pentylcyclohexyl)cyclohexyl)-2,3-difluoro-1-ethoxybenzene 17.0% shows the following properties.

$T_{NI}$=121.3° C., $\Delta\varepsilon$=−6.6, $\Delta n$=0.109.

EXAMPLE 8

A liquid crystal composition consisting of:

4-(trans-4-n-pentyl-4-silacyclohexyl)-1-methoxybenzene 7.5%, 4-(trans-4-n-heptyl-4-silacyclohexyl)-1-methoxybenzene 7.5%, 4-(trans-4-n-pentyl-4-silacyclohexyl)-2,3-difluoro-1-ethoxybenzene 7.5%, 4-(trans-4-n-heptyl-4-silacyclohexyl)-2,3-difluoro-1-ethoxybenzene 7.5%, 4-(trans-4-(trans-4-n-propyl-4-silacyclohexyl) cyclohexyl)-2,3-difluoro-1-ethoxybenzene 11.7%, 4-(trans-4-(trans-4-n-pentyl-4-silacyclohexyl) cyclohexyl)-2,3-difluoro-1-ethoxy benzene 11.7%, trans-4-(trans-4-(2,3-difluoro-4-ethoxyphenoxymethyl) cyclohexyl)1-n-propyl-1-silacyclohexane 23.3%, and trans-4-(trans-4-(2,3-difluoro-4-ethoxyphenoxymethyl) cyclohexyl)1-n-pentyl-1-silacyclohexane 23.3% shows the following properties.

$T_{NI}$=85.4° C., $\Delta\varepsilon$=−7.0, $\Delta n$=0.100.

EXAMPLE 9

A liquid crystal composition consisting of:

trans-4-(2-(2,3-difluoro-4-ethoxyphenyl)ethyl)-1-n-pentyl-1-silacyclohexane 10.0%, trans-4-(2-(2,3-difluoro-4-ethoxyphenyl)ethyl)-1-n-heptyl-1-silacyclohexane 10.0%, 4-(trans-4-(trans-4-n-propyl-4-silacyclohexyl) cyclohexyl)-2,3-difluoro-1-ethoxybenzene 13.3%, 4-(trans-4-(trans-4-n-pentyl-4-silacyclohexyl) cyclohexyl)-2,3-difluoro-1-ethoxybenzene 13.3%, trans-4-(trans-4-(2,3-difluoro-4-ethoxyphenoxymethyl) cyclohexyl)-1-n-propyl-1-cyclohexane 26.7%, and trans-4-(trans-4-(2,3-difluoro-4-ethoxyphenoxymethyl) cyclohexyl)-1-n-pentyl-1-cyclohexane 26.7% shows the following properties.

$T_{NI}$=94.5° C., $\Delta\varepsilon$=−8.0, $\Delta n$=0.097.

EXAMPLE 10

A liquid crystal composition consisting of:

4-(trans-4-n-propylcyclohexyl)-1-ethoxybenzene 5.0%, 4-(trans-4-n-pentylcyclohexyl)-1-ethoxybenzene 5.0%, 4-(trans-4-n-pentyl-4-silacyclohexyl)-2,3-difluoro-1-ethoxybenzene 10.0%, 4-(trans-4-n-heptyl-4-silacyclohexyl)-2,3-difluoro-1-ethoxybenzene 10.0%, 4-(trans-4-(trans-4-n-propyl-4-silacyclohexyl) cyclohexyl-2,3-difluoro-1-ethoxybenzene 20.0%, 4-(trans-4-(trans-4-n-pentyl-4-silacyclohexyl) cyclohexyl-2,3-difluoro-1-ethoxybenzene 20.0%, trans-4-(trans-4-(2,3-difluoro-4-ethoxyphenoxymethyl) cyclohexyl)-1-n-propylcyclohexane 15.0%, and trans-4-(trans-4-(2,3-difluoro-4-n-pentylphenoxymethyl) cyclohexyl)-1-n-propylcyclohexane 15.0% shows the following properties.

$T_{NI}$=98.7° C., $\Delta\varepsilon$=−5.5, $\Delta n$=0.101.

EXAMPLE 11

A liquid crystal composition consisting of:

4-(trans-4-n-pentyl-4-silacyclohexyl)-1-methoxybenzene 7.5%, 4-(trans-4-n-heptyl-4-silacyclohexyl)-1-methoxybenzene 7.5%, trans-4-(2,3-difluoro-4-ethoxyphenoxymethyl)-1-n-pentyl-1-silacyclohexane 5.5%, trans-4-(2,3-difluoro-4-ethoxyphenoxymethyl)-1-n-heptyl-1-silacyclohexane 5.5%, trans-4-(2-(trans-4-(2,3-difluoro-4-ethoxyphenyl) cyclohexyl)ethyl)-1-n-propyl-1-silacyclohexane 17.5%, trans-4-(2-(trans-4-(2,3-difluoro-4-ethoxyphenyl) cyclohexyl)ethyl)-1-n-pentyl-1-silacyclohexane 17.5%, trans-4-(trans-4-(2,3-difluoro-4-ethoxyphenoxymethyl) cyclohexyl)-1-n-propyl-1-silacyclohexane 17.5%, trans-4-(trans-4-(2,3-difluoro-4-ethoxyphenoxymethyl) cyclohexyl)-1-n-pentyl-1-silacyclohexane 17.5%, trans,trans-4-(4-(4-n-propyl-4-silacyclohexyl) cyclohexyl)-2',3'-difluoro-4'-ethoxybiphenyl 2.0%, and trans,trans-4-(4-(4-n-pentyl-4-silacyclohexyl) cyclohexyl)-2',3'-difluoro-4'-ethoxybiphenyl 2.0% was obtained.

EXAMPLE 12

A liquid crystal composition consisting of:

trans,trans-4-(4-n-propoxycyclohexyl)-1-n-propyl-1-silacyclohexane 12.0%, trans,trans-4-(4-ethoxycyclohexyl)-1-n-pentyl-1-silacyclohexane 3.0%, 4-(trans-4-n-pentylcyclohexyl)-2,3-difluoro-1-ethoxybenzene 7.5%, 4-(trans-4-n-heptylcyclohexyl)-2,3-difluoro-1-ethoxybenzene 7.5%, trans-4-(2-(trans-4-(2,3-difluoro-4-ethoxyphenyl) cyclohexyl)ethyl)-1-n-propyl-1-silacyclohexane 13.0%, trans-4-(2-(trans-4-(2,3-difluoro-4 -ethoxyphenyl) cyclohexyl)ethyl)-1-n-pentyl-1-silacyclohexane 12.0%, trans-4-(trans-4-(2-(2,3-difluoro-4-ethoxyphenyl)ethyl) cyclohexyl-1-n-propylcyclohexane 13.0%, trans-4-(trans-4-(2-(2,3-difluoro-4-ethoxyphenyl)ethyl) cyclohexyl-1-n-pentylcyclohexane 12.0%, 4'-(trans-4-n-propylcyclohexyl)-2,3-difluoro-4-ethoxybiphenyl 10.0%, and 4'-(trans-4-n-pentylcyclohexyl)-2,3-difluoro-4-ethoxybiphenyl 10.0% was obtained.

Applied Example 1

To the liquid crystal composition of Example 8, SI-426, an azo type dichroic pigment manufactured by Mitsui Toatsu Fine Co., was mixed by 1 wt. %, and a dichroic pigment liquid crystal composition was obtained. This mixed composition showed the high voltage retention and low threshold voltage characteristic originally possessed by the liquid composition of Example 8 and also exhibited a high dichroic ratio.

Applied Example 2

To the liquid crystal composition of Example 8, M-483, an anthraquinone type dichroic pigment manufactured by Mitsui Toatsu Fine Co., was mixed by 1 wt. %, and a dichroic pigment liquid crystal composition was obtained. This mixed composition showed the high voltage retention and low threshold voltage characteristic originally possessed by the liquid composition of Example 8 and also exhibited a high dichroic ratio.

Applied Example 3

To the liquid crystal composition of Example 8, S-344, a mixed dichroic pigment of azo type and anthraquinone type manufactured by Mitsui Toatsu Fine Co., was mixed by 1 wt. %, and a dichroic pigment liquid crystal composition was obtained. This mixed composition showed high voltage retention and low threshold voltage characteristic originally possessed by the liquid composition of Example 8 and also exhibited a high dichroic ratio.

References related to the syntheses of the compounds having formulas I–V

| Formula | Japanese Patent Provisional Publication No. | U.S. patent application No. |
|---|---|---|
| I | 7-070148 | 267,027 |
|  | 8-053469 | 262,542 |
|  | 7-173176 | 331,957 |
| II | 8-109186 | 322,549 |
|  | 7-215983 | 341,218 |
|  | 7-252273 | 377,961 |
|  | 7-278158 | 388,307 |
|  | 7-291978 | 395,706 |
|  | 8-048689 | 395,706 |
|  | 8-245651 | 395,706 |
| III | 8-239388 | 566,392 |
|  | *8-040479 | 566,392 |
| IV | 8-176161 | None |
|  | 7-228585 | 362,964 |
| V | *7-176623 | 491,141 |
|  | 8-104693 | 511,816 |
|  | 6-231560 | **0713878 |

*Number of Japanese Patent Application
**Number of European Patent Provisional Publication

We claim:

1. A liquid crystal composition comprising two or more compounds selected from the group consisting of formulas I, III, IV and V,

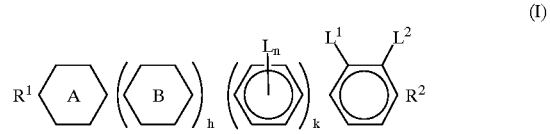

(I)

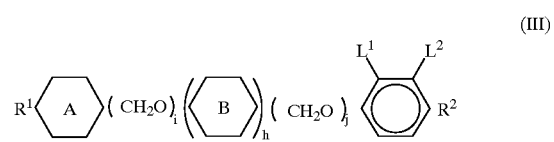

(III)

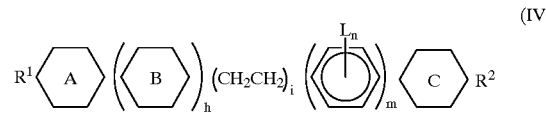

(IV)

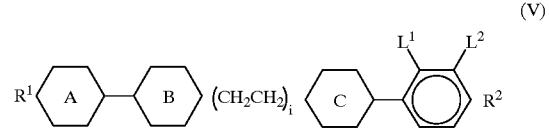

(V)

where $R^1$ is an alkyl group having 2–7 carbon atoms, an alkoxyalkyl group having 2–7 carbon atoms, a mono- or difluoroalkyl group having 2–7 carbon atoms, or an alkenyl group having 2 to 7 carbon atoms; h, i, j, and k denote 0 or 1 with proviso that i+j=1; m is 0, 1 or 2; a six-membered ring expressed by A, B, or C respectively represents any one of trans-1-sila-1,4-cyclohexylene, trans-4-sila-1,4-cyclohexylene, or trans-1,4-cyclohexylene group; L represents F, and $L^1$ and $L^2$ represent H or F; n is 0, 1 or 2; and $R^2$ represents H, $R^1$ or $OR^1$, wherein at least two compounds thereof contains trans-1-sila-1,4-cyclohexylene group or trans-4-sila-1,4-cyclohexylene group.

2. A liquid crystal display element comprising said liquid crystal composition claimed in claim 1.

3. The liquid crystal composition according to claim 1 wherein said two or more compounds are at least one compound of formula I and at least one compound selected from the group consisting of formula III, formula IV and formula V.

4. A liquid crystal composition comprising one or more compounds selected from the group consisting of:

(I)

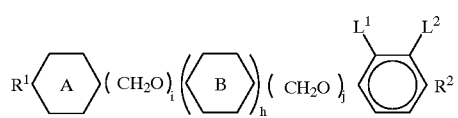
(III)

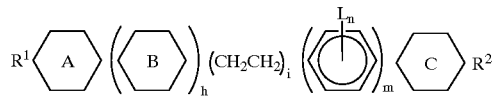
(IV)

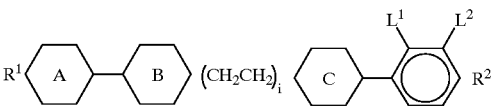
(V)

wherein $R^1$ is an alkyl group having 2–7 carbon atoms, an alkoxyalkyl group having 2–7 carbon atoms, a mono-or difluoroalkyl group having 2–7 carbon atoms, or an alkenyl group having 2–7 carbon atoms, h, i, j, and k denote 0 or 1, with the proviso that i+j=1; m is 0, 1 and 2 and for formula I, k is 0 and h is 1; a six-membered ring expressed by A, B, or C, respectively, represents any one of trans-1-sila-1,4-cyclohexylene, trans-4-sila-1,4-cyclohexylene, or trans-1,4-cyclohexylene group; L represents F, and $L^1$ and $L^2$ represent H or F; n is 0, 1, or 2; and $R^2$ represents H, $R^1$ or $OR^1$, wherein at least one compound thereof contains trans-1-sila-1,4-cyclohexylene group or trans-4-sila-1,4-cyclohexylene group.

5. A liquid crystal display element comprising said liquid crystal composition according to claim 3.

6. A liquid crystal display element comprising said liquid crystal composition according to claim 4.

* * * * *